(12) United States Patent
Yaksick et al.

(10) Patent No.: US 9,164,669 B1
(45) Date of Patent: *Oct. 20, 2015

(54) DIAL CONTROL FOR MOBILE DEVICES

(75) Inventors: Jeffrey D. Yaksick, Sunnyvale, CA (US); David A. Brown, Mountain View, CA (US); Michael A. Cleron, Menlo Park, CA (US); Karl Rosaen, Ann Arbor, MI (US); Amar S. Gandhi, Mountain View, CA (US); James B. Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 696 days.

This patent is subject to a terminal disclaimer.

(21) Appl. No.: 12/872,472

(22) Filed: Aug. 31, 2010

(51) Int. Cl.
G06F 3/033 (2013.01)
G06F 3/0484 (2013.01)
G06F 3/0482 (2013.01)
G06F 3/0481 (2013.01)
G06F 3/0488 (2013.01)

(52) U.S. Cl.
CPC .......... *G06F 3/04847* (2013.01); *G06F 3/0482* (2013.01); *G06F 3/0484* (2013.01); *G06F 3/04817* (2013.01); *G06F 3/04883* (2013.01)

(58) Field of Classification Search
CPC . G06F 3/0488; G06F 3/04883; G06F 3/0482; G06F 3/0484; G06F 3/04817; G06F 3/04847
USPC ......................................... 715/834, 863, 864
See application file for complete search history.

(56) References Cited

U.S. PATENT DOCUMENTS

| 8,046,721 | B2 | 10/2011 | Chaudhri et al. | |
|---|---|---|---|---|
| 2004/0155909 | A1* | 8/2004 | Wagner | 345/854 |
| 2004/0212617 | A1* | 10/2004 | Fitzmaurice et al. | 345/440 |
| 2005/0212760 | A1 | 9/2005 | Marvit et al. | |
| 2005/0253817 | A1 | 11/2005 | Rytivaara et al. | |
| 2006/0267967 | A1* | 11/2006 | Hinckley et al. | 345/179 |
| 2007/0150826 | A1* | 6/2007 | Anzures et al. | 715/772 |
| 2007/0150842 | A1* | 6/2007 | Chaudhri et al. | 715/863 |
| 2007/0283292 | A1* | 12/2007 | Bucher et al. | 715/810 |
| 2008/0204423 | A1* | 8/2008 | Kim | 345/173 |
| 2008/0220752 | A1* | 9/2008 | Forstall et al. | 455/415 |
| 2008/0287169 | A1* | 11/2008 | Kim et al. | 455/575.4 |
| 2009/0061837 | A1* | 3/2009 | Chaudhri et al. | 455/418 |

(Continued)

OTHER PUBLICATIONS

Christoph Grundel et al., "A Direct Manipulation User Interface for the Control of Communication Processes—Making Call Handling Manageable," Proceedings of Human Factors in Telecommunications, 1999, 8 pages.

*Primary Examiner* — Tuyetlien Tran
(74) *Attorney, Agent, or Firm* — Fish & Richardson P.C.

(57) ABSTRACT

Implementations of the present disclosure provide dial controls on a mobile computing device. In one aspect, a method includes displaying a first function graphic in a dial control, the first function graphic being displayed at a first base position on a touchscreen display of a mobile device, detecting a user selection in a first region of the touchscreen display, the first region being associated with the first function graphic, detecting user motion corresponding to the user selection, animating the dial control to rotate for arcing movement of the first function graphic from the first base position on the touchscreen display in response to detecting user motion, determining a measure of user motion, comparing the measure of user motion to a threshold measure, and performing one or more functions on the mobile device in response to the measure of user motion exceeding the threshold measure.

19 Claims, 10 Drawing Sheets

(56) References Cited

U.S. PATENT DOCUMENTS

| | | | |
|---|---|---|---|
| 2009/0064055 A1* | 3/2009 | Chaudhri et al. | 715/863 |
| 2009/0094562 A1* | 4/2009 | Jeong et al. | 715/863 |
| 2009/0265666 A1* | 10/2009 | Hsieh et al. | 715/835 |
| 2009/0288032 A1* | 11/2009 | Chang et al. | 715/776 |
| 2010/0001967 A1* | 1/2010 | Yoo | 345/173 |
| 2010/0037185 A1* | 2/2010 | Li | 715/863 |
| 2010/0099394 A1* | 4/2010 | Hainzl | 455/418 |
| 2010/0127998 A1* | 5/2010 | Hyun | 345/173 |
| 2010/0146384 A1* | 6/2010 | Peev et al. | 715/255 |
| 2010/0159995 A1* | 6/2010 | Stallings et al. | 455/566 |
| 2010/0162169 A1* | 6/2010 | Skarp | 715/833 |
| 2010/0162182 A1* | 6/2010 | Oh et al. | 715/863 |
| 2010/0227640 A1* | 9/2010 | Kim et al. | 455/550.1 |
| 2010/0248689 A1* | 9/2010 | Teng et al. | 455/411 |
| 2010/0257490 A1* | 10/2010 | Lyon et al. | 715/863 |
| 2010/0269040 A1* | 10/2010 | Lee | 715/702 |
| 2010/0306705 A1* | 12/2010 | Nilsson | 715/835 |
| 2011/0087970 A1* | 4/2011 | Swink et al. | 715/752 |
| 2011/0163972 A1* | 7/2011 | Anzures et al. | 345/173 |
| 2011/0271181 A1* | 11/2011 | Tsai et al. | 715/702 |

\* cited by examiner

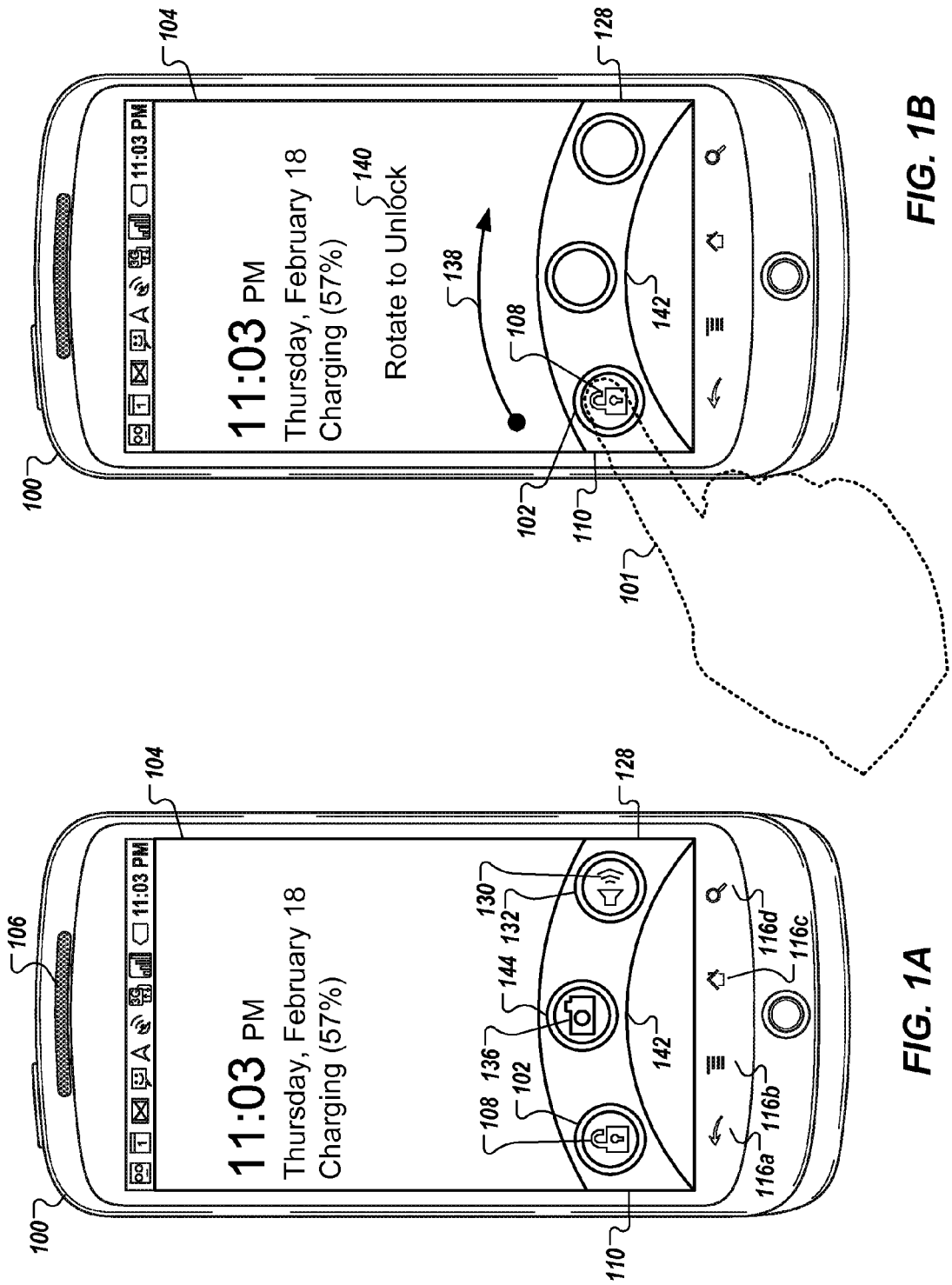

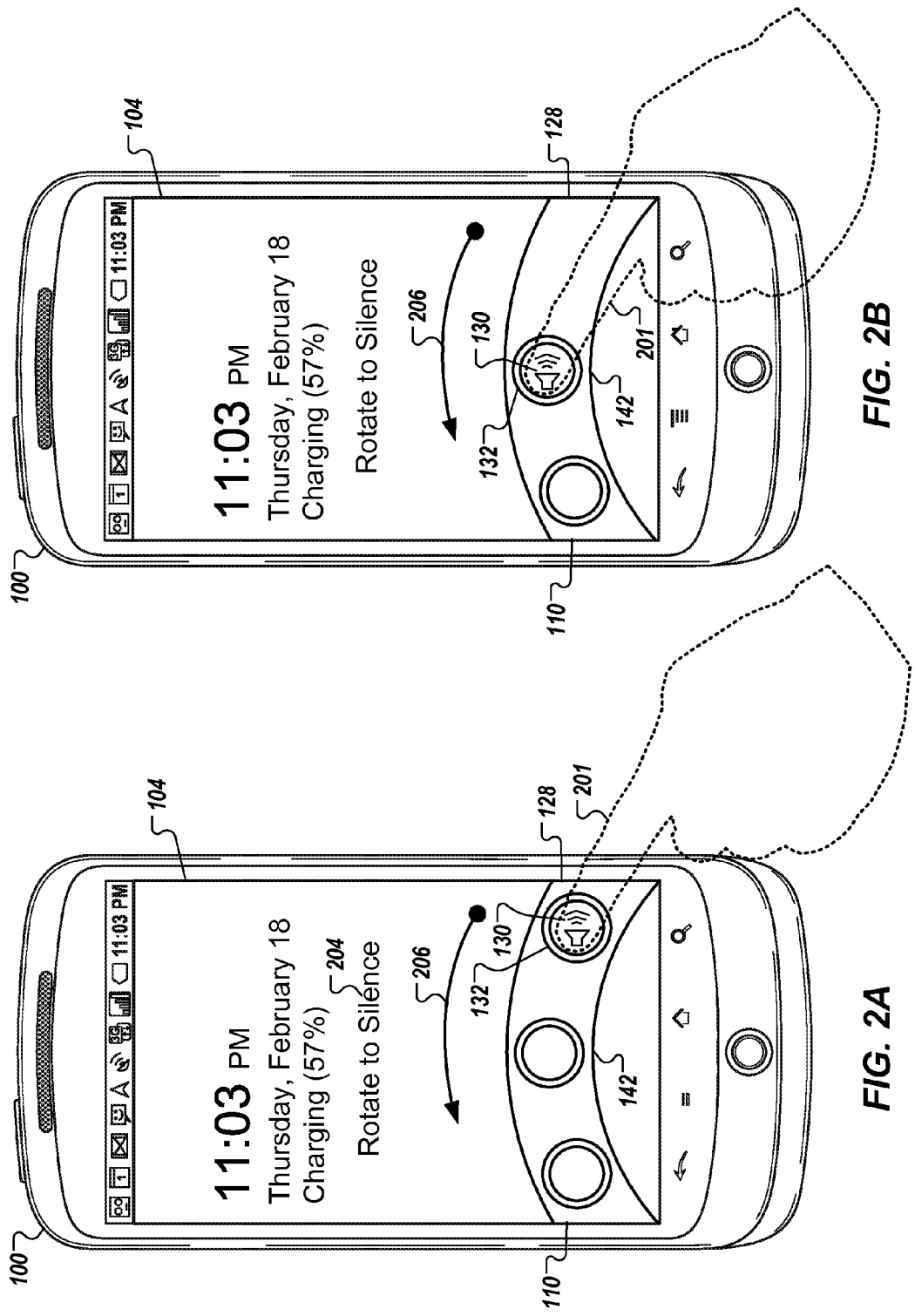

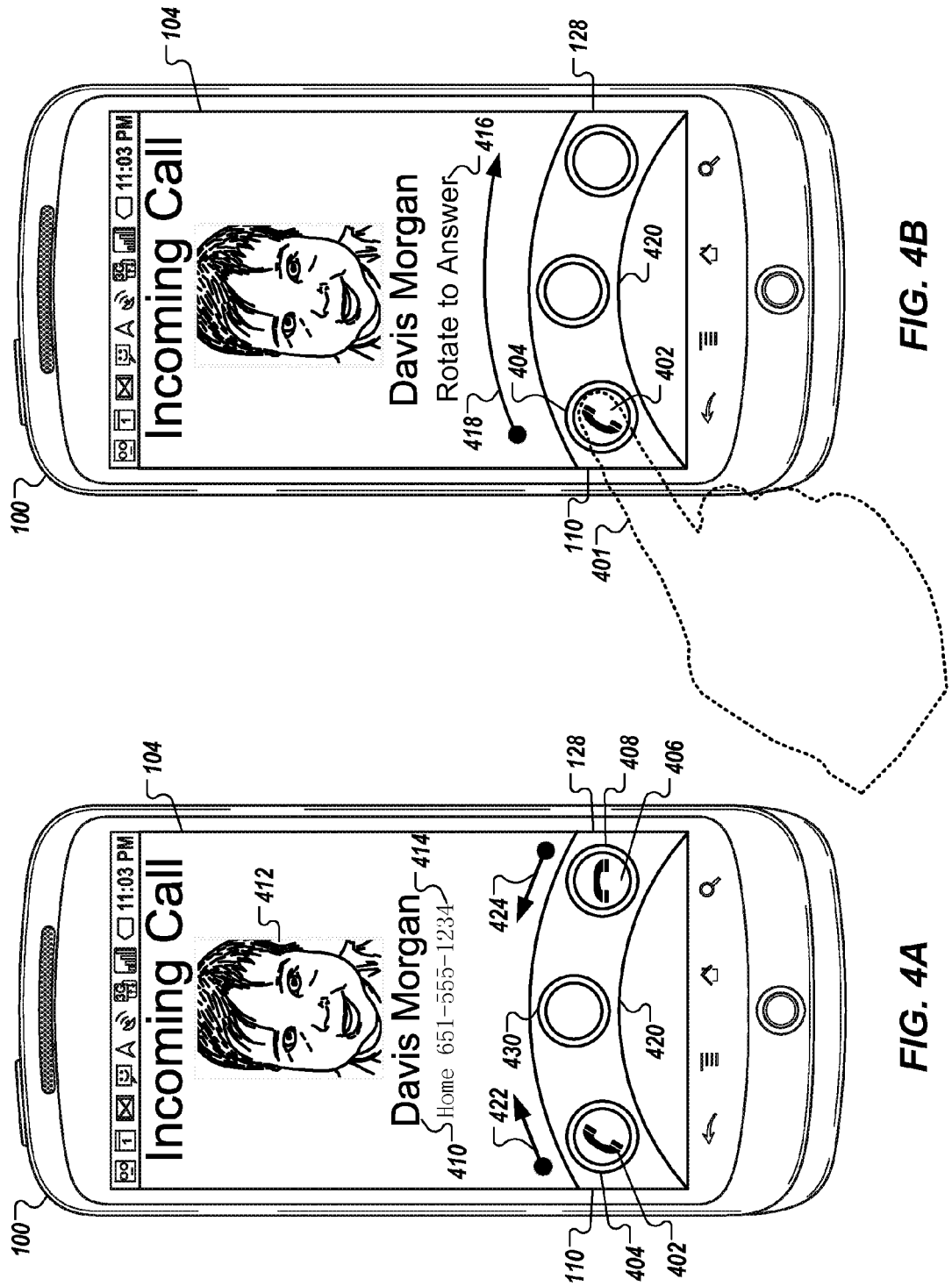

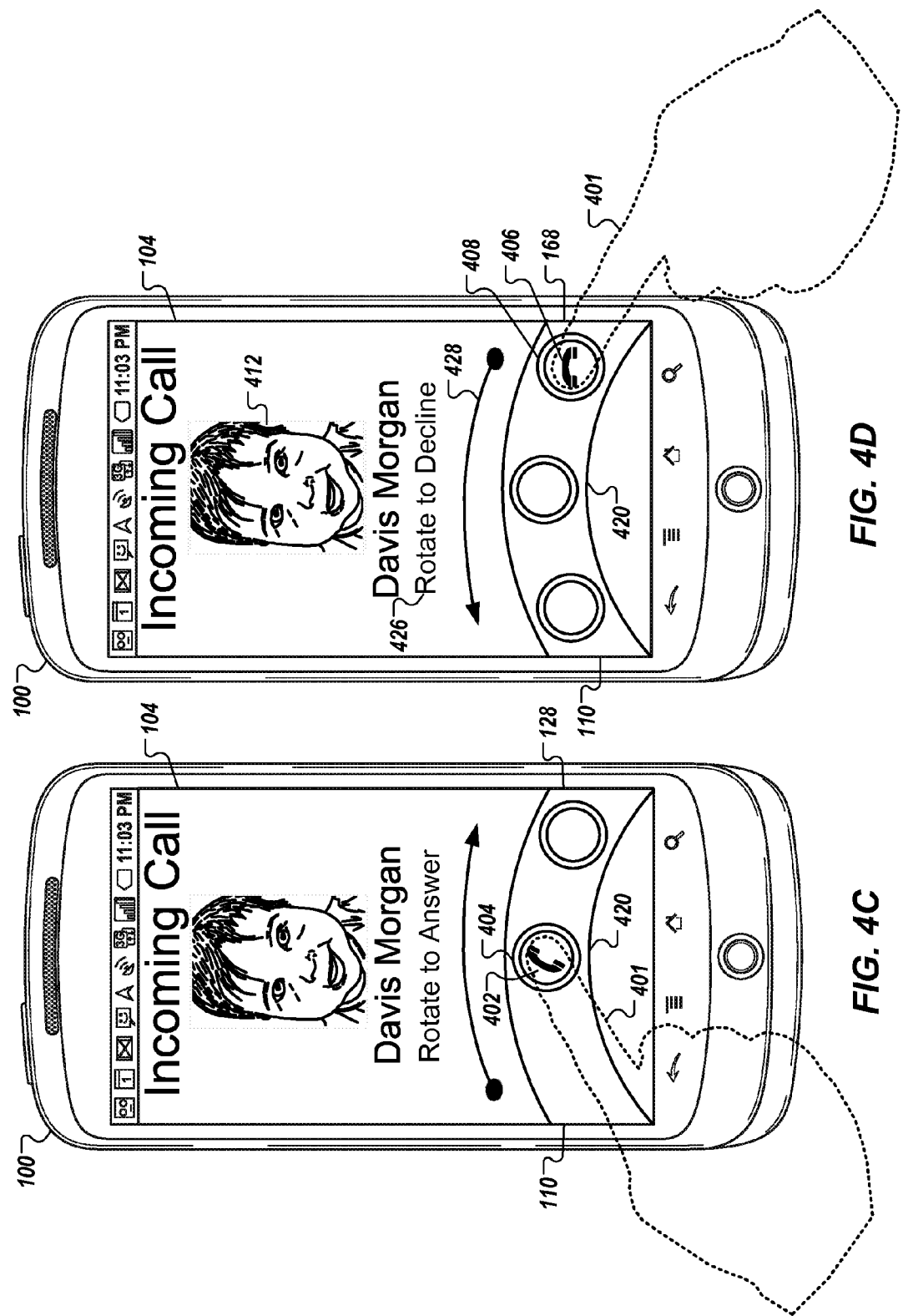

DIAL CONTROL FOR MOBILE DEVICES

BACKGROUND

This specification generally relates to systems and techniques for a user interface dial control affordance for a mobile computing device.

In some implementations, it is advantageous to protect an underlying application running on a mobile computing device from receiving accidental user input. For example, user input can be received from a keyboard, pointing device, or on-screen contact with a touchscreen included with the mobile computing device. The user may place the mobile computing device in a location that may inadvertently provide erroneous input to the device (e.g., the user places the device in a pocket, backpack, or handbag). Locking the mobile computing device can prevent the occurrence of the accidental input as the computing device can ignore any user input it receives while in a locked state.

SUMMARY

According to one innovative aspect of the subject matter described in this specification, a mobile computing device with a touchscreen can lock the touchscreen to prevent accidental input to underlying applications running on the mobile computing device. A user interface (UI) touchscreen can include multiple dial controls that allow the user to interact with the mobile computing device in the locked state. The user can activate each of the dial controls on the touchscreen using an arcing gesture to rotate the dial control on the touchscreen. The arcing gesture moves a graphic from one side of the touchscreen towards an opposite side of the touchscreen. When the graphic moves a sufficient degree, the mobile computing device performs an operation designated by the dial control dependent upon the state of the mobile computing device.

For example, the mobile device can be a mobile phone. A user can use a dial control to unlock their mobile phone from a locked state. The user can use a dial control to control a ringer of the mobile phone (e.g., turn off (silence) the ringer or turn on (un-silence) the ringer). The user can use a dial control to answer an incoming call on the mobile device when it is in a locked state. The user can use a dial control to decline an incoming call on the mobile device when it is in a locked state. The user can use a dial control to activate a camera on the mobile device when it is in a locked state.

The activation of a dial control can occur using a simple gesture performed by the user (e.g., a one digit (finger or thumb) arcing gesture of the dial on the touchscreen). However, the activation of the dial control to unlock the mobile computing device, activate the camera, or answer or decline an incoming call can be a difficult, if not impossible, action to perform accidentally by inadvertent contact with the touchscreen (e.g., while the device is in the user's pocket). The simple activation of the dial control can allow a user convenient and fast access to unlock the mobile computing device, activate the camera, or answer or decline an incoming call while preventing accidental input on the touchscreen device.

Innovative aspects of the subject matter described in this specification may be embodied in methods that include the actions of displaying a first function graphic in a dial control, the first function graphic being displayed at a first base position on the touchscreen display, detecting a user selection in a first region of the touchscreen display, the first region being associated with the first function graphic, detecting user motion corresponding to the user selection, animating the dial control to rotate for arcing movement of the first function graphic from the first base position on the touchscreen display in response to detecting user motion, determining a measure of user motion, comparing the measure of user motion to a threshold measure, and performing one or more functions on the mobile device in response to the measure of user motion exceeding the threshold measure.

These and other implementations may each optionally include one or more of the following features. For instance, the one or more functions include entering or exiting an unlocked mode, answering or declining a received call, changing a mode of a ringer, and executing an application on the mobile device; the method further including continuing animation of the dial control to rotate on the touchscreen display in response to the measure of user motion exceeding the threshold measure; the method further including detecting cessation of the user selection, determining, upon detecting cessation of the user selection, that the degree of user motion is less than the threshold degree, and animating the dial control to rotate for arcing movement of the first function graphic back to the first base position on the touchscreen display; the one or more functions further including removing the dial control from the touchscreen display, and displaying a plurality of icons on the touchscreen display, each icon corresponding to a respective application executable by the mobile device; the method further including concurrent with displaying the first function graphic, displaying a second function graphic in the dial control, the second function graphic being displayed at a second base position on the touchscreen display, and removing the second function graphic from the touchscreen display upon detecting the user selection in the first region; the method further including displaying a first instructional graphic in response to detecting the user selection in the first region; and the first instructional graphic including characters and an arcing arrow.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1A-1D demonstrate unlocking a mobile computing device using an unlock dial control displayed on a touchscreen display device.

FIGS. 2A-2E demonstrate controlling a ringer of a mobile computing device using dial controls displayed on a touchscreen display device.

FIGS. 4A-4E demonstrate accepting and declining an incoming phone call on a mobile computing device using dial controls displayed on a touchscreen display device.

Like reference numbers represent corresponding parts throughout.

DETAILED DESCRIPTION

Figure 1D:
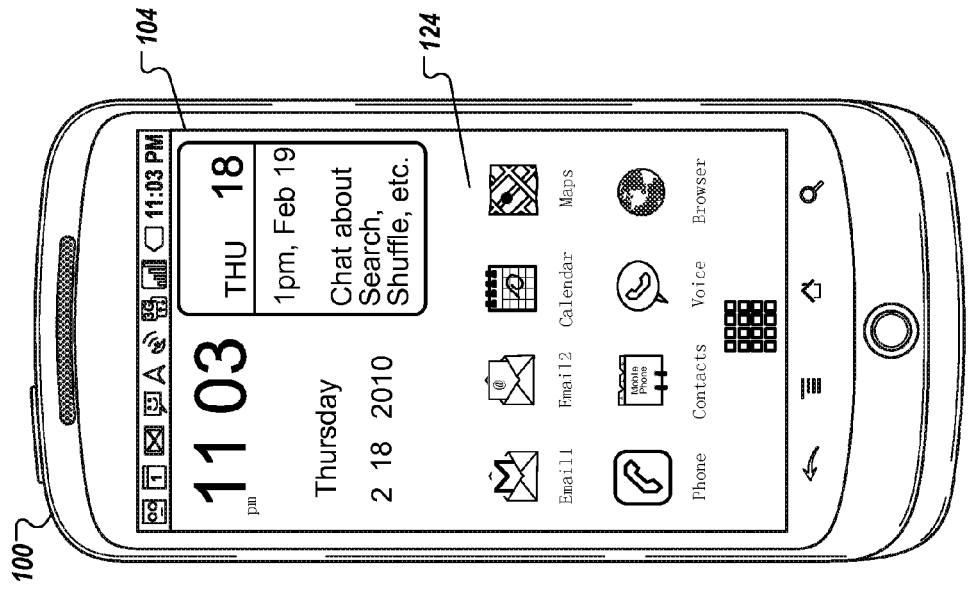

FIGS. 1A-1D demonstrate unlocking a mobile computing device 100 using a dial control 102 displayed on a touchscreen display device 104.

In the illustrated examples, the mobile computing device 100 is depicted as a handheld mobile telephone (e.g., a smartphone or an application telephone) that includes the touchscreen display device 104 for presenting content to a user of the mobile computing device 100. The mobile computing device 100 includes various input devices (e.g., the touchscreen display device 104, a keyboard (not shown)) for receiving user input that influences the operation of the mobile computing device 100. In further implementations, the mobile computing device 100 may be a laptop computer, a tablet computer, a personal digital assistant, an embedded system (e.g., a car navigation system), a desktop computer, or a computerized workstation.

The mobile computing device 100 may include various visual, auditory, and tactile user-output mechanisms. An example visual output mechanism is the touchscreen display device 104, which can visually display video, graphics, images, and text that combine to provide a visible user interface. An example tactile user-output mechanism is a small electric motor that is connected to an unbalanced weight to provide a vibrating alert (e.g., to silently vibrate the mobile computing device 100 to alert a user of an incoming telephone call or confirm user contact with the touchscreen display device 104). The mobile computing device 100 may include one or more speakers 106 that convert an electrical signal into sound, for example, music, an audible alert, or voice of an individual in a telephone call. The mobile computing device 100 may include mechanical or touch sensitive buttons 116a-d.

The mobile computing device 100 can determine a position of physical contact with the touchscreen display device 104 (e.g., a position of contact by a finger 101 or a stylus). Using the touchscreen display device 104, various "virtual" input mechanisms may be produced, where a user interacts with a graphical user interface element depicted on the touchscreen display device 104 by contacting the graphical user interface element. As shown in FIG. 1A, the graphical user interface elements can be an unlock graphic 108, a sound off graphic 130, and a camera graphic 136 displayed in an unlock dial control 102, a camera activation dial control 144 and a sound off dial control 132, respectively, included in an arc 142.

In some implementations, the unlock graphic 108 may be a pictorial representation of the function performed by interacting with the graphical user interface element, in this example, the unlock dial control 102. As shown in FIG. 1A, the pictorial representation for the unlock graphic 108 is an unlocked lock signifying the unlocking of the mobile computing device 100 when interacting with the unlock dial control 102.

Referring to the example shown in FIGS. 1A-1D, a user wants to unlock the mobile computing device 100 from a locked state. Referring to FIG. 1B, the user selects the unlock dial control 102 by placing a finger 101 in contact with the unlock graphic 108. Upon contact with the unlock graphic 108, the touchscreen display device 104 no longer displays the sound off graphic 130 or the camera graphic 136. The touchscreen display device 104 displays unlock instructions 140 indicating to the user how to unlock the mobile computing device 100. The touchscreen display device 104 displays an unlock rotate arrow 138 indicating the direction of rotation the user's finger 101 should follow on the touchscreen display device 104 in order to unlock the mobile computing device 100.

Figure 1C:
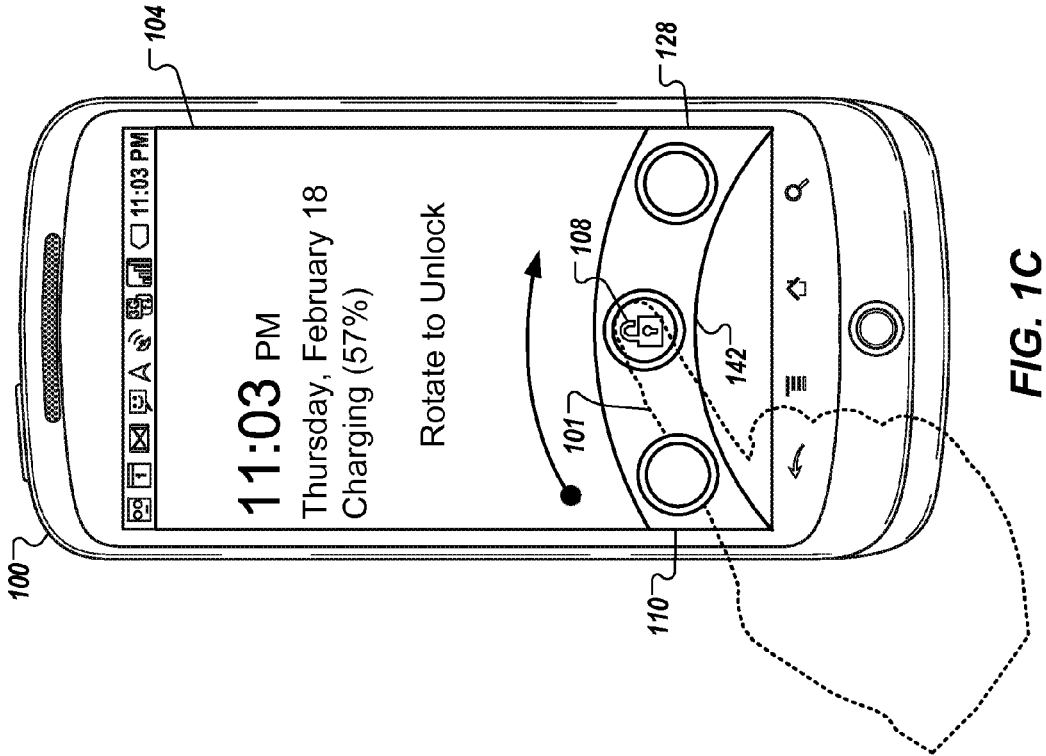

In some implementations, the mobile computing device 100 provides tactile feedback when the user's finger initially makes contact with the unlock graphic 108. In some implementations, while the user's finger remains in contact with the unlock graphic 108, the unlock graphic 108 and the unlock dial control 102 are highlighted (e.g., displayed brighter than before contact). While the user's finger maintains contact with the unlock graphic 108, the user uses an arcing gesture to move the unlock dial control 102 on the touchscreen display device 104. The user, using the arcing gesture, moves the unlock dial control 102 from a first side 110 of the touchscreen display device 104 towards a second side 128, where the second side 128 is opposite to the first side 110. The user, using the arcing gesture, moves the unlock dial control 102 within the arc 142. FIG. 1C shows the unlock dial control 102 as the user moves it from the first side 110 of the touchscreen display device 104 towards the second side 128 within the arc 142.

The movement of the unlock dial control 102 within the arc 142 further animates the unlock dial control 102 to appear as though it is being dragged across the touchscreen display device 104 within the arc 142 from the first side 110 of the touchscreen display device 104 towards the second side 128 of the touchscreen display device 104. As the user finger 101 moves across the touchscreen display device 104 within the arc 142, the touchscreen display device 104 animates the display of the unlock dial control 102 within the arc 142. The animation of the unlock dial control 102 continues across the touchscreen display device 104 within the arc 142 as long as the user maintains contact with the unlock graphic 108, while dragging the unlock dial control 102 across the touchscreen display device 104 within the arc 142.

The user moves the unlock dial control 102 within the arc 142 to within a threshold measure of movement to induce unlocking of the mobile computing device 100. That is, unlocking of the mobile computing device 100 can occur when a measure of motion of the user's finger 101 across the touchscreen display device 104 is equal to or greater than the threshold measure. The measure can include a distance and the threshold measure can include a threshold distance. For example, the unlocking of the mobile computing device 100 can occur when the user's finger 101 moves the unlock dial control 102 approximately three quarters of the way towards the second side 128, exceeding the threshold distance. The animation of the unlock dial control 102 will continue on its path within the arc 142 towards the second side 128 even if the user's finger 101 ceases contact with the unlock graphic 108. The mobile computing device 100 then unlocks. The mobile computing device 100, in its unlocked state, displays a graphical user interface 124 on the touchscreen display device 104 as shown in FIG. 1D. For example, the graphical user interface 124 is a collection of one or more graphical interface elements. The graphical user interface 124 may be static (e.g., the display appears to remain the same over a period of time), or may be dynamic (e.g., the graphical user interface includes graphical interface elements that animate without user input).

In some situations, a user may decide, while moving the unlock dial control 102 from the first side 110 of the touchscreen display device 104 towards the second side 128, that they no longer want to unlock the mobile computing device 100. The user can remove their finger from contact with the unlock graphic 108 before moving the unlock dial control 102 to the threshold measure in the arc 142. Removing of the user's finger from the unlock graphic 108 disconnects or breaks the physical contact between the user and the touchscreen display device 104. The unlock dial control 102 no longer moves across the touchscreen display device 104 in the arc 142. Referring to FIG. 1A, the unlock dial control 102 retracts back to its position proximate to the first side 110. Alternatively, the user may move the finger 101 backwards in an arcing gesture towards the first side 110 of the touchscreen display device 104, moving the unlock dial control 102 in the arc 142 to its position proximate to the first side 110. Additionally, the touchscreen display device 104 displays the camera graphic 136 and the sound off graphic 130. The mobile computing device 100 remains in a locked state.

FIGS. 2A-2E demonstrate controlling a ringer of a mobile computing device 100 using dial controls displayed on a touchscreen display device 104. Specifically, FIGS. 2A-2B demonstrate silencing of the ringer of the mobile computing device 100 using the sound off dial control 132 displayed on the touchscreen display device 104.

In some implementations, the sound off graphic 130 may be a pictorial representation of the current state of the speaker or ringer of the mobile computing device 100 and the function performed by interacting with the graphical user interface element, in this example, the sound off dial control 132. As shown in FIG. 2A, the pictorial representation of a speaker emitting sound for the sound off graphic 130 signifies the ringer of the mobile computing device 100 is currently enabled. The user interacting with the sound off dial control 132 can control the ringer (e.g., disable the ringer and silence the mobile computing device 100).

Referring to FIGS. 2A-2B, a user wants to silence the ringer of the mobile computing device 100 while the mobile computing device 100 is in a locked state. For example, the user is at a piano recital in an auditorium where any audible tone from the mobile computing device 100 would disrupt the recital. Referring to FIG. 2A, the user selects the sound dial control 132 by placing a finger 201 in contact with the sound status graphic 130. The sound status graphic 130 indicates that the sound is on, and that the sound dial control 132 can be actuated to turn the sound off. Upon contact with the sound status graphic 130, on the touchscreen display device 104 no longer displays the unlock graphic 108 or the camera graphic 136. The touchscreen display device 104 displays silence instructions 204 indicating to the user how to silence the ringer of the mobile computing device 100. The touchscreen display device 104 displays a silence rotate arrow 206 indicating the direction of rotation the user's finger 201 should follow on the touchscreen display device 104 in order to silence the ringer of the mobile computing device 100.

In some implementations, the mobile computing device 100 provides tactile feedback when the user's finger initially makes contact with the sound off graphic 130. In some implementations, while the user's finger remains in contact with the sound status graphic 130, the sound status graphic 130 and the sound dial control 132 are highlighted (e.g., displayed brighter than before contact). While the user's finger 201 maintains contact with the sound status graphic 130, the user uses an arcing gesture to move the sound dial control 132 on the touchscreen display device 104. The user, using the arcing gesture, moves the sound dial control 132 from the second side 128 of the touchscreen display device 104 towards the first side 110, where the first side 110 is opposite to the second side 128. The user, using the arcing gesture, moves the sound dial control 132 within the arc 142. FIG. 2B shows the sound dial control 132 as the user moves it from the second side 128 of the touchscreen display device 104 towards the first side 110 within the arc 142.

The movement of the sound dial control 132 within the arc 142 further animates the sound dial control 132 to appear as though it is being dragged across the touchscreen display device 104 within the arc 142 from the second side 128 of the touchscreen display device 104 towards the first side 110 of the touchscreen display device 104. As the user moves their finger 101 across the touchscreen display device 104 within the arc 142, the touchscreen display device 104 animates the display of the sound dial control 132 within the arc 142. The animation of the sound dial control 132 continues across the touchscreen display device 104 within the arc 142 as long as the user maintains contact with sound status graphic 130, while dragging the sound dial control 132 across the touchscreen display device 104 within the arc 142.

The user moves the sound dial control 132 within the arc 142 to within a threshold measure of movement to induce the silencing of the ringer of the mobile computing device 100. That is, silencing of the ringer of the mobile computing device 100 can occur when a measure of motion of the user's finger 101 across the touchscreen display device 104 is equal to or greater than the threshold measure. The measure can include a distance and the threshold measure can include a threshold distance. For example, the silencing of the ringer of the mobile computing device 100 can occur when the user's finger moves the sound dial control 132 approximately three quarters of the way towards the first side 110, exceeding the threshold distance. The mobile computing device 100 silences the ringer of the mobile computing device 100.

Figure 2D:
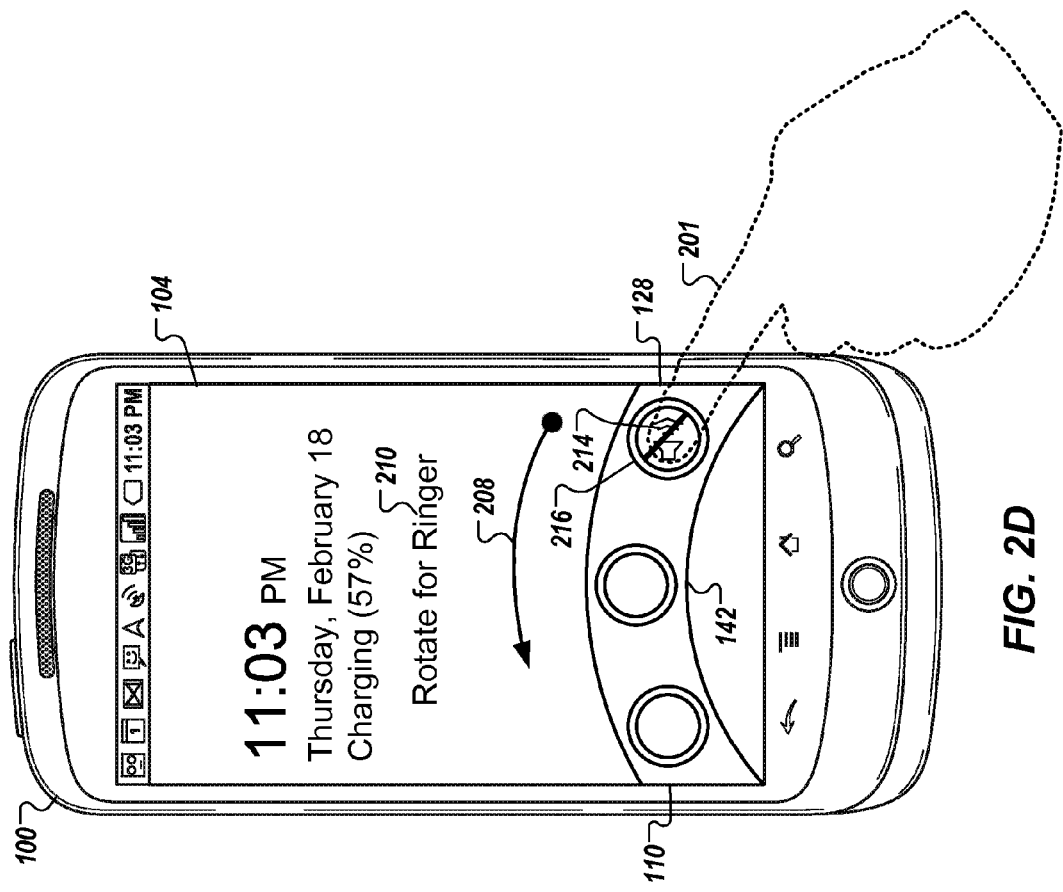
Figure 2C:
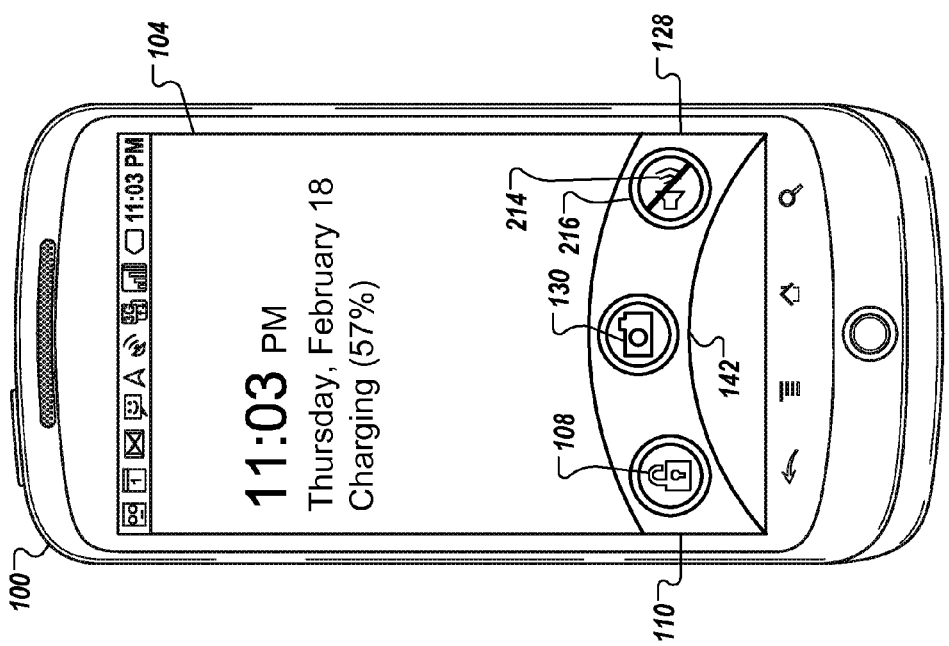

Referring to FIG. 2C, the touchscreen display device 104 displays a sound status graphic 214 in a sound dial control 216. The sound status graphic 214 indicates that the sound is off, and that the sound dial control 216 can be actuated to turn the sound on. Additionally, the touch screen display device displays the unlock graphic 108 and the camera graphic 136. In some implementations, the sound on graphic 214 may be a pictorial representation of the current state of the mobile computing device 100 and the function performed by interacting with the sound dial control 216. For example, the pictorial representation for the sound status graphic 214 is a speaker emitting sound with a line drawn diagonally across it signifying the ringer of the mobile computing device 100 is currently disabled and the mobile computing device 100 is silent. Interacting with the sound dial control 216 can enable the ringer of the mobile computing device 100 (e.g., the mobile computing device 100 is no longer silent but can emit audible sounds).

In the implementation demonstrated in FIGS. 2A-2E, the sound dial control 216 and the sound dial control 132 are located proximate to the second side 128 of the touchscreen display device 104. The touchscreen display device 104 can display the sound status graphic 214 in a different color than the sound status graphic 130. This can help to additionally distinguish the different states of the mobile computing device 100 represented by the sound status graphic 130 and the sound status graphic 214.

Referring to FIGS. 2A-2B, in some situations, a user may decide, while moving the sound dial control 132 from the second side 128 of the touchscreen display device 104 towards the first side 110, that they no longer want to silence the ringer of the mobile computing device 100. The user's finger 201 can be removed from contact with the sound status graphic 130 before the sound dial control 132 is moved the threshold measure in the arc 142. Removing the user's finger from the sound graphic 130 disconnects or breaks the physical contact between the user and the touchscreen display device 104. The sound dial control 132 no longer moves across the touchscreen display device 104 in the arc 142. Referring to FIG. 2A, the sound dial control 132 retracts back to its position proximate to the second side 128. Alternatively, the user may move their finger backwards in an arcing gesture towards the second side 128 of the touchscreen display device 104, moving the sound dial control 132 in the arc 142 to a position proximate to the second side 128. Additionally, the touchscreen display device 104 displays the camera graphic 136 and the sound off graphic 130. The ringer of the mobile computing device 100 remains enabled. The touchscreen display device 104 appears as shown in FIG. 1A.

Figure 2E:
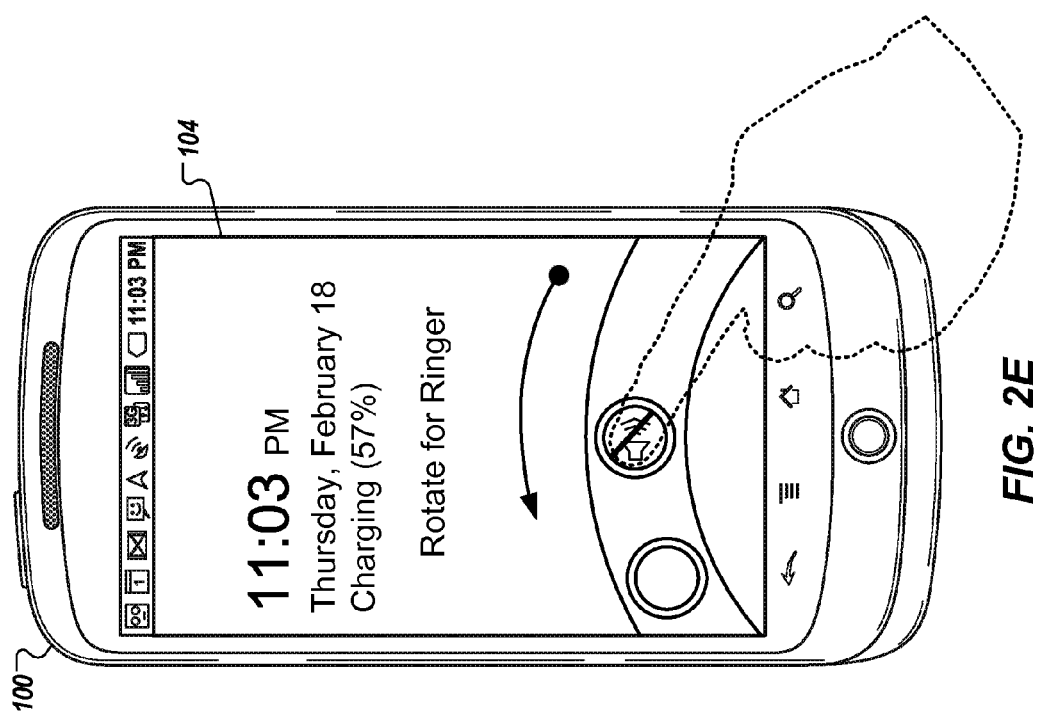

Referring to FIGS. 2C-2E, a user wants to enable the ringer of the mobile computing device 100, while the mobile computing device 100 is in a locked state. For example, the piano recital is over, the user has left the auditorium and is in their car traveling to meet friends for dinner. The user places their finger 201 in contact with the sound status graphic 214 included in the sound dial control 216. As shown in FIG. 2D, upon contact with the sound status graphic 214, the touchscreen display device 104 no longer displays the unlock graphic 108 and the camera graphic 136. The touchscreen display device 104 displays ringer instructions 210 indicating to the user how to enable the ringer of the mobile computing device 100. The touchscreen display device 104 displays a ringer rotate arrow 208 indicating the direction of rotation the user's finger 201 should follow on the touchscreen display device 104 in order to enable the ringer of the mobile computing device 100.

In some implementations, the mobile computing device 100 provides tactile feedback when the user's finger initially makes contact with the sound status graphic 214. In some implementations, while the user's finger remains in contact with the sound status graphic 214, the sound status graphic 214 and the sound dial control 216 are highlighted (e.g., displayed brighter than before contact). While the user's finger maintains contact with the sound status graphic 214, the user uses an arcing gesture to move the sound dial control 216 on the touchscreen display device 104. The user, using the arcing gesture, moves the sound dial control 216 from the second side 128 of the touchscreen display device 104 towards the first side 110, where the first side 110 is opposite to the second side 128. The user, using the arcing gesture, moves the sound dial control 216 within the arc 142. FIG. 2E shows the sound dial control 216 as the user moves it from the second side 128 of the touchscreen display device 104 towards the first side 110 within the arc 142.

The movement of the sound dial control 216 within the arc 142 further animates the sound dial control 216 to appear as though it is being dragged across the touchscreen display device 104 within the arc 142 from the second side 128 of the touchscreen display device 104 towards the first side 110 of the touchscreen display device 104. As the user's finger 201 moves across the touchscreen display device 104 within the arc 142, the touchscreen display device 104 animates the display of the sound dial control 216 within the arc 142. The animation of the sound dial control 216 continues across the touchscreen display device 104 within the arc 142 as long as the user maintains contact with sound status graphic 214, while dragging the sound on dial control 216 across the touchscreen display device 104 within the arc 142.

The user moves the sound dial control 216 within the arc 142 to within a threshold measure of movement to enable the ringer of the mobile computing device 100. That is, enabling of the ringer of the mobile computing device 100 can occur when a measure of motion of the user's finger 201 across the touchscreen display device 104 is equal to or greater than the threshold measure. The measure can include a distance and the threshold measure can include a threshold distance. For example, the enabling of the ringer of the mobile computing device 100 can occur when the user's finger moves the sound dial control 216 approximately three quarters of the way towards the first side 110, exceeding the threshold distance. The mobile computing device 100 enables the ringer of the mobile computing device 100. Referring to FIG. 2A, the touchscreen display device 104 displays the sound status graphic 130 in the sound dial control 132 along with the camera graphic 136 in the camera activation dial control 144 and the unlock graphic 108 in the unlock dial control 102.

Referring to FIGS. 2C-2E, a user may decide, while moving the sound dial control 216 from the second side 128 of the touchscreen display device 104 towards the first side 110, that they no longer want to enable the ringer of the mobile computing device 100. The user's finger 201 can be removed from contact with the sound status graphic 214 before they move the sound dial control 216 to within the threshold measure in the arc 142. Removing of the user's finger from the sound status graphic 214 disconnects or breaks the physical contact between the user and the touchscreen display device 104. The sound dial control 216 no longer moves across the touchscreen display device 104 in the arc 142. Referring to FIG. 2C, the sound dial control 216 retracts back to a position proximate to the second side 128. Alternatively, the user may move their finger backwards in an arcing gesture towards the second side 128 of the touchscreen display device 104, moving the sound dial control 216 in the arc 142 to its position along the second side 128. Additionally, the touchscreen display device 104 displays the camera graphic 136 and the sound status graphic 130. The ringer of the mobile computing device 100 remains disabled (silenced).

Figure 3B:
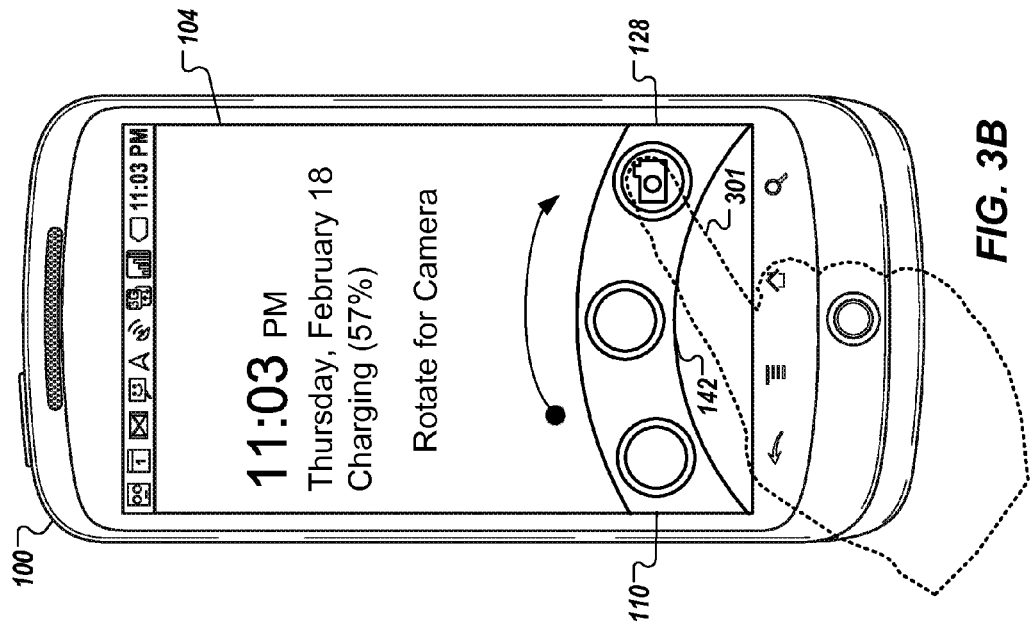
FIGS. 3A-3B demonstrate controlling the activation of a camera included in a mobile computing device using a camera activation dial control on a touchscreen display device.
Figure 3A:
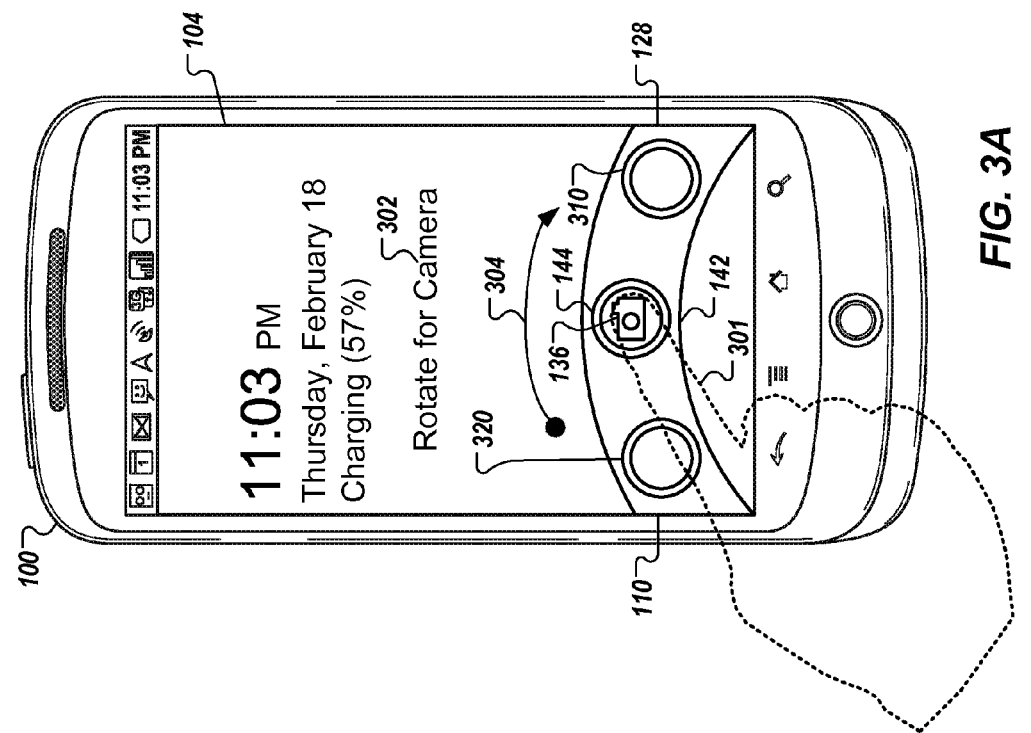

FIGS. 3A-3B demonstrate controlling the activation of a camera included in a mobile computing device 100 using the camera activation dial control 144 on the touchscreen display device 104.

Referring to FIGS. 3A-3B, a user wants to activate a camera included in the mobile computing device 100 while the mobile computing device 100 is in a locked state. The user's finger 301 is placed in contact with the camera graphic 136 included in the camera activation dial control 144. As shown in FIG. 3A, upon contact with the camera graphic 136, the touchscreen display device 104 no longer displays the unlock graphic 108 and the sound status graphic 130. In some situations, the touchscreen display device 104 no longer displays the unlock graphic 108 and the sound status graphic 214. The touchscreen display device 104 displays camera activation instructions 302 indicating to the user how to activate the camera of the mobile computing device 100. The touchscreen display device 104 displays a camera activation rotate arrow 304 indicating the direction of rotation the user's finger 301 should follow on the touchscreen display device 104 in order to activate the camera of the mobile computing device 100.

In some implementations, the mobile computing device 100 provides tactile feedback when the user's finger initially makes contact with the camera graphic 136. In some implementations, while the user's finger remains in contact with the camera graphic 136, the camera graphic 136 and the camera activation dial control 144 are highlighted (e.g., displayed brighter than before contact). While the user's finger 301 maintains contact with the camera graphic 136, the user uses an arcing gesture to move the camera activation dial control 144 on the touchscreen display device 104. The user, using the arcing gesture, moves the camera activation dial control 144 from the center of the arc 142 on the touchscreen display device 104 towards the second side 128. The user, using the arcing gesture, moves the camera activation dial control 144 within the arc 142. When the user moves the camera activation dial control 144 within the arc 142 to the second side 128 as shown in FIG. 3B, the mobile computing device 100 activates the camera included in the mobile computing device 100.

The movement of the camera activation dial control 144 within the arc 142 further animates the camera activation dial control 144 to appear as though it is being dragged across the touchscreen display device 104 within the arc 142 from the center of the touchscreen display device 104 towards the second side 128 of the touchscreen display device 104. As the user's finger 301 moves across the touchscreen display device 104 within the arc 142, the touchscreen display device 104 animates the display of the camera activation dial control 144 within the arc 142. The animation of the camera activation dial control 144 continues across the touchscreen display device 104 within the arc 142 as long as the user maintains contact with the camera graphic 136, while dragging the camera activation dial control 144 across the touchscreen display device 104 within the arc 142.

The user moves the camera activation dial control 144 within the arc 142 past a threshold measure of movement to induce the activation of the camera included with the mobile computing device 100. That is, the activation of the camera included with the mobile computing device 100 can occur when a measure of motion of the user's finger 101 across the touchscreen display device 104 is equal to or greater than the threshold measure. The measure can include a distance and the threshold measure can include a threshold distance. For example, camera activation can occur when the user's finger 301 moves the camera activation dial control 144 into contact with a dial control 310 located on the second side 128 of the mobile computing device 100, exceeding the threshold distance. The animation of the camera activation dial control 144 will continue on its path within the arc 142 towards the second side 128 even if the user removes their finger 301 from the camera graphic 136. The mobile computing device 100 activates the camera included with the mobile computing device 100.

Referring to FIGS. 3A-3B, in some situations, a user may decide to not activate the camera included in the mobile computing device 100, while moving the camera activation dial control 144. The user's finger 301 can be removed from contact with the camera graphic 136 before the threshold measure is achieved. By removing the user's finger from contact with the camera graphic 136, the physical contact between the user and the touchscreen display device 104 is disconnected. The camera activation dial control 144 no longer moves across the touchscreen display device 104 in the arc 142, and retracts back to its position in the center of the arc 142 on the touchscreen display device 104. Alternatively, the user's finger may move backward in an arcing gesture towards the center of the arc 142 on the touchscreen display device 104, moving the camera activation dial control 144 in the arc 142 to its position on the center of the arc 142. Additionally, the touchscreen display device 104 displays the camera graphic 136 and the sound off graphic 130.

In some implementations, while the user's finger 301 maintains contact with the camera graphic 136, the user uses an arcing gesture to move the camera activation dial control 144 on the touchscreen display device 104 from the center of the arc 142 towards the first side 110. The user, using the arcing gesture, moves the camera activation dial control 144 within the arc 142. When the user moves the camera activation dial control 144 to within a threshold measure in the arc 142, the mobile computing device 100 activates the camera included in the mobile computing device 100. For example, camera activation can occur when the user's finger 301 moves the camera activation dial control 144 into contact with a dial control 320 located on the first side 110 of the mobile computing device 100, exceeding the threshold distance. The animation of the camera activation dial control 144 will continue on its path within the arc 142 towards the first side 110 even if the user removes their finger 301 from the camera graphic 136. The mobile computing device 100 activates the camera included with the mobile computing device 100.

In some implementations, a background wallpaper of the touchscreen display device 104 can be visible behind the arc 142 as the user moves the unlock dial control 102, the sound off dial control 132, the sound on dial control 216 or the camera activation dial control 144 (e.g., the arc 142 is semi-transparent). In some implementations, the touchscreen display device 104 displays the arc 142 as a solid track. The touchscreen display device 104 then displays the unlock dial control 102 with unlock graphic 108, the camera activation dial control 144 with camera graphic 136 and the sound off dial control 132 with sound off graphic 130 (or the sound on dial control 216 with sound on graphic 214) within the arc 142. The background wallpaper may not be visible behind the solid arc 142.

Figure 4E:
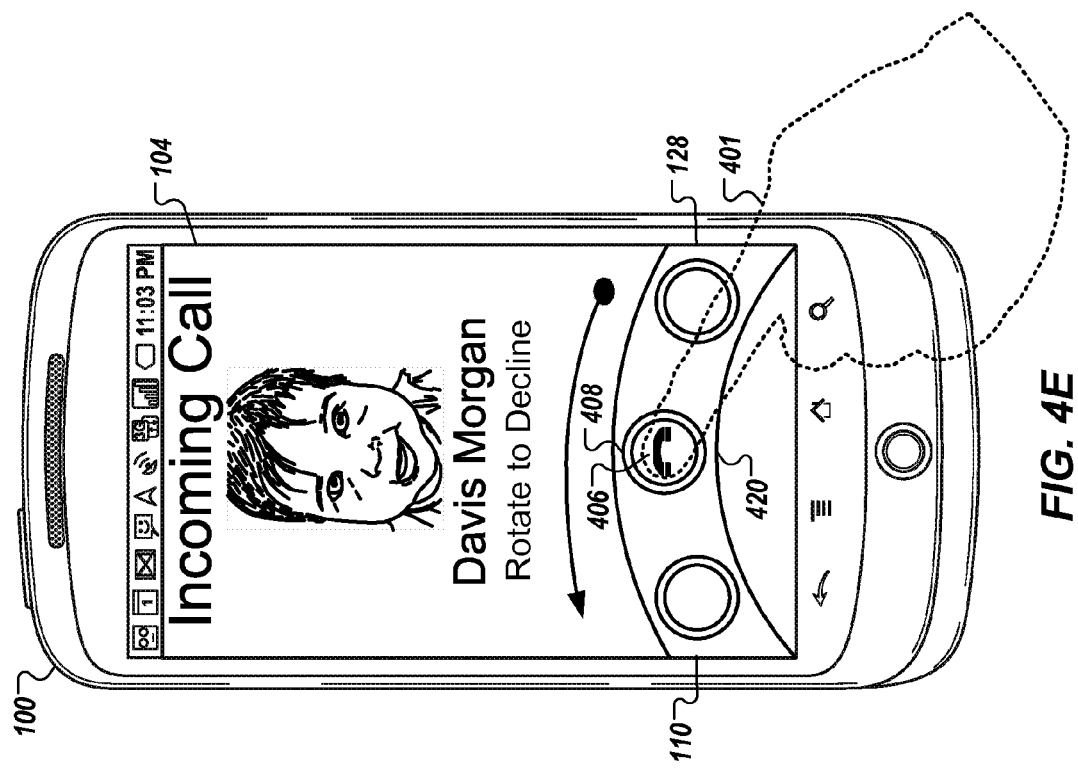

FIGS. 4A-4E demonstrate accepting and declining an incoming phone call on a mobile computing device 100 using dial controls displayed on a touchscreen display device 104. Referring to FIG. 4A, the touchscreen display device 104 displays graphical user interface elements such as an answer graphic 402 included in an answer dial control 404 and a decline graphic 406 included in a decline dial control 408.

In some implementations, the answer graphic 402 and the decline graphic 406 may be pictorial representations of the functions performed by interacting with the answer dial control 404 and the decline dial control 408 graphical user interface elements, respectively. As shown in FIG. 4A, the pictorial representation for the answer graphic 402 is a telephone in a "picked up" or answered state signifying the acceptance or answering of the incoming phone call on the mobile computing device 100. The pictorial representation for the decline graphic 406 is a telephone in a "hung up" or unanswered state signifying declining or not answering the incoming phone call on the mobile computing device 100.

Referring again to FIG. 4A, answer direction arrow 422 indicates the direction to move the answer dial control 404 in an arc 420 in order to answer an incoming call. Decline direction arrow 424 indicates the direction to move the decline dial control 408 in the arc 420 in order to decline an incoming call. When the mobile computing device 100 receives an incoming phone call, the touchscreen display device 104 can display a name for the incoming caller (e.g., caller name 410), a picture of the incoming caller (e.g., caller picture 412) and a phone number for the incoming call (e.g., caller phone number 414).

Referring to FIGS. 4B-4C, the user, in order to answer an incoming call, selects the answer graphic 402 by placing a finger 401 in contact with the answer graphic 402. Referring to FIG. 4B, the user selects the answer dial control 404 by placing a finger 401 in contact with the answer graphic 402. Upon contact with the answer graphic 402, the touchscreen display device 104 no longer displays the decline graphic 406. Additionally, the touchscreen display device 104 no longer displays the answer direction arrow 422 and the decline direction arrow 424. The touchscreen display device 104 displays answer instructions 416 indicating to the user how to answer the incoming phone call on the mobile computing device 100. The touchscreen display device 104 displays an answer rotate arrow 418 indicating the direction of rotation the user's finger 401 should follow on the touchscreen display device 104 in order to answer the incoming call on the mobile computing device 100.

In some implementations, the mobile computing device 100 provides tactile feedback when the user's finger 401 initially makes contact with the answer graphic 402. In some implementations, while the user's finger 401 remains in contact with the answer graphic 402, the answer graphic 402 and the answer dial control 404 are highlighted (e.g., displayed brighter than before contact). While the user's finger 401 maintains contact with the answer graphic 402, the user uses an arcing gesture to move the answer dial control 404 on the touchscreen display device 104. The user, using the arcing gesture, moves the answer dial control 404 from the first side 110 of the touchscreen display device 104 towards the second side 128, where the second side 128 is opposite to the first side 110. The user, using the arcing gesture, moves the answer dial control 404 within the arc 420. FIG. 4C shows the answer dial control 404 as the user moves it from the first side 110 of the touchscreen display device 104 towards the second side 128 within the arc 420.

The movement of the answer dial control 404 within the arc 142 further animates the answer dial control 404 to appear as though it is being dragged across the touchscreen display device 104 within the arc 142 from the first side 110 of the touchscreen display device 104 towards the second side 128 of the touchscreen display device 104. As the user moves their finger 401 across the touchscreen display device 104 within the arc 142, the touchscreen display device 104 animates the display of the answer dial control 404 within the arc 142. The animation of the answer dial control 404 continues across the touchscreen display device 104 within the arc 142 as long as the user maintains contact with the answer graphic 402, while dragging the answer dial control 404 across the touchscreen display device 104 within the arc 142.

The user moves the answer dial control 404 within the arc 142 to within a threshold measure of movement to answer an incoming call on the mobile computing device 100. That is, answering an incoming call on the mobile computing device 100 can occur when a measure of motion of the user's finger 401 across the touchscreen display device 104 is equal to or greater than the threshold measure. The measure can include a distance and the threshold measure can include a threshold distance. For example, the answering of a call on the mobile computing device 100 can occur when the user's finger 401 moves the answer dial control 404 approximately three quarters of the way towards the second side 128, exceeding the threshold distance. The animation of the answer dial control 404 will continue on its path within the arc 142 towards the second side 128 even if the user removes their finger 401 from the answer dial control 404. The user answers the incoming phone call. The touchscreen display device 104 then displays graphical user interface elements (not shown) related to the handling of the receipt of the incoming call (e.g., a graphical user interface element to end the call).

In some situations, a user may decide while moving the answer dial control 404 from the first side 110 of the touchscreen display device 104 towards the second side 128 that they no longer want to answer the incoming call. The user can then remove their finger 401 from the answer graphic 402 before they move the answer dial control 404 to within the threshold measure in the arc 142. The removing of the user's finger 401 from the answer graphic 402 disconnects or breaks the physical contact between the user and the touchscreen display device 104. The answer dial control 404 no longer moves across the touchscreen display device 104 in the arc 420. Referring to FIG. 4A, the answer dial control 404 retracts back to its position along the first side 110. Alternatively, the user may move their finger backwards in an arcing gesture towards the first side 110 of the touchscreen display device 104, moving the answer dial control 404 in the arc 420 to its position along the first side 110. Additionally, the touchscreen display device 104 displays the decline graphic 406, the answer direction arrow 422 and the decline direction arrow 424. The mobile computing device 100 continues to receive the incoming call.

Referring to FIGS. 4D-4E, a user receives an incoming phone call on the mobile computing device 100 while the mobile computing device 100 is in a locked state. For example, the user is visiting their mother in the hospital and would prefer to ignore any incoming calls from their place of employment. On receiving the incoming call and seeing that it is from a coworker (recognizing the name, picture and phone number associated with the incoming phone call), the user decides to decline the incoming call (not answer the call on the mobile computing device 100). Referring to FIG. 4D, in order to decline the incoming call, the user selects the decline graphic 406 by placing their finger 401 in contact with the decline graphic 406. Upon contact with the decline graphic 406, the touchscreen display device 104 no longer displays the answer graphic 402. The touchscreen display device 104 can display decline instructions 426 indicating to the user how to decline (not answer) the incoming phone call on the mobile computing device 100. The touchscreen display device 104 displays a decline rotate arrow 428 indicating the direction of rotation the user's finger 401 should follow on the touchscreen display device 104 in order to decline the incoming call on the mobile computing device 100.

In some implementations, the mobile computing device 100 provides tactile feedback when the user's finger 401 initially makes contact with the decline graphic 406. In some implementations, while the user's finger remains in contact with the decline graphic 406, the decline graphic 406 and the decline dial control 408 are highlighted (e.g., displayed brighter than before contact). While the user's finger 401 maintains contact with the decline graphic 406, the user uses an arcing gesture to move the decline dial control 408 on the touchscreen display device 104. The user, using the arcing gesture, moves the decline dial control 408 from the second side 128 of the touchscreen display device 104 towards the first side 110, where the first side 110 is opposite to the second side 128. The user, using the arcing gesture, moves the decline dial control 408 within the arc 420. FIG. 4E shows the decline dial control 408 as the user moves it from the second side 128 of the touchscreen display device 104 towards the first side 110 within the arc 420.

The movement of the decline dial control 408 within the arc 142 further animates the decline dial control 408 to appear as though it is being dragged across the touchscreen display device 104 within the arc 142 from the second side 128 of the touchscreen display device 104 towards the first side 110 of the touchscreen display device 104. As the user moves their finger 401 across the touchscreen display device 104 within the arc 142, the touchscreen display device 104 animates the display of the decline dial control 408 within the arc 142. The animation of the decline dial control 408 continues across the touchscreen display device 104 within the arc 142 as long as the user maintains contact with decline graphic 406, while dragging the decline dial control 408 across the touchscreen display device 104 within the arc 142.

The user moves the decline dial control 408 within the arc 142 to within a threshold measure of movement to decline (not answer) an incoming call on the mobile computing device 100. That is, declining an incoming call on the mobile computing device 100 can occur when a measure of motion of the user's finger 401 across the touchscreen display device 104 is equal to or greater than the threshold measure. The measure can include a distance and the threshold measure can include a threshold distance. For example, the declining of the incoming call on the mobile computing device 100 can occur when the user's finger 401 moves the decline dial control 408 approximately three quarters of the way towards the first side 110, exceeding the threshold distance. The animation of the decline dial control 408 will continue on its path within the arc 142 towards the first side 110 even if the user removes their finger 401 from the decline graphic 406. The incoming phone call is then declined or not answered by the user (e.g., the mobile computing device 100 no longer indicates there is an incoming call and the caller is connected to the user's voicemail). The touchscreen display device 104 then displays the graphical user interface elements shown in FIG. 1A.

In some situations, a user may decide while moving the decline dial control 408 from the second side 128 of the touchscreen display device 104 towards the first side 110 that they no longer want to decline the incoming call. The user can then remove their finger 401 from the decline graphic 406 before they move the decline dial control 408 to within the threshold measure in the arc 142. The removing of the user's finger 401 from the decline graphic 406 disconnects or breaks the physical contact between the user and the touchscreen display device 104. The decline dial control 408 no longer moves across the touchscreen display device 104 in the arc 420. Referring to FIG. 4A, the decline dial control 408 retracts back to its position along the second side 128. Alternatively, the user may move their finger backwards in an arcing gesture towards the second side 128 of the touchscreen display device 104, moving the decline dial control 408 in the arc 420 to its position along the second side 128. Additionally, the touchscreen display device 104 displays the answer graphic 402, the answer direction arrow 422 and the decline direction arrow 424. The mobile computing device 100 continues to receive the incoming call.

Figure 5:
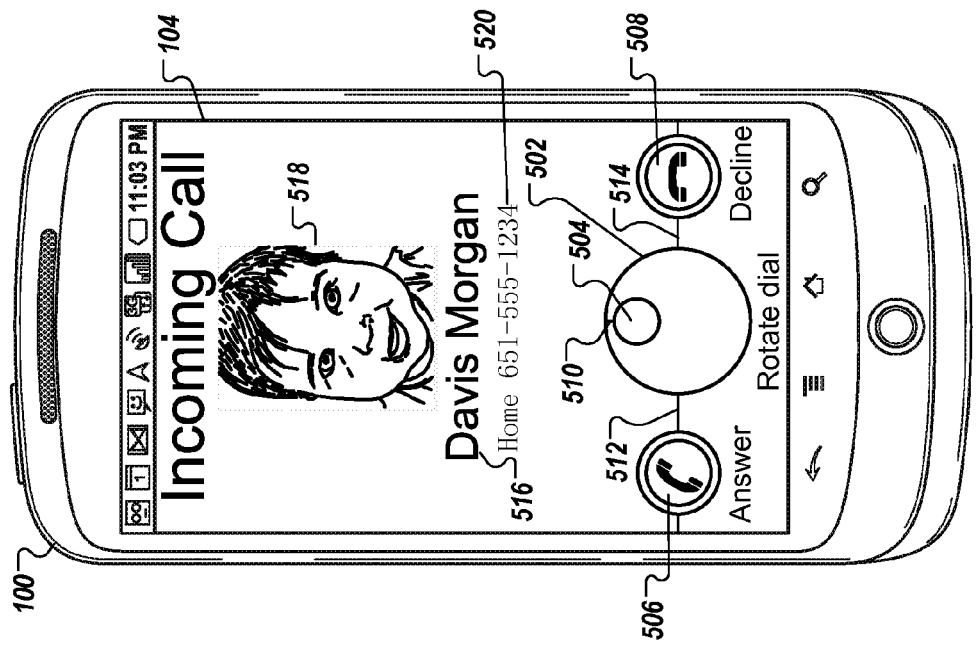
FIG. 5 is an illustration showing an alternative control for unlocking and controlling a ringer of a mobile computing device.

FIG. 5 is an illustration showing an alternative control for unlocking and controlling a ringer of the mobile computing device 100. In the example shown in FIG. 5, a user can operate jog dial control 502 displayed on the touchscreen display device 104 to answer or decline an incoming phone call. The touchscreen display device 104 in FIG. 5 shows an incoming call received on the mobile computing device 100. The touchscreen display device displays the name for the incoming caller (e.g., caller name 516), a picture of the incoming caller (e.g., caller picture 518) and a phone number for the incoming call (e.g., caller phone number 520). Initially, the touchscreen display device 104 displays the jog dial control 502 in an initial position.

The user selects the jog dial control 502 by placing a finger in contact with a jog dial activation point 504. In some implementations, upon contact with the jog dial activation point 504, the mobile computing device 100 provides tactile feedback when the user's finger initially makes contact with the jog dial activation point 504. While the user's finger remains in contact with the jog dial activation point 504, the jog dial control 502 can be highlighted (e.g., displayed brighter than before contact). The user, using an arced rotation gesture, can move the jog dial control 502 to the left towards an answer icon 506. When a center 510 of the jog dial control 502 aligns with an answer line 512, the user answers the incoming phone call. The touchscreen display device 104 then displays graphical user interface elements (not shown) related to the handling of the receipt of the incoming call (e.g., a graphical user interface element to end the call). In some implementations, when the center 510 of the jog dial control 502 aligns with the answer line 512, the answer icon 506 can be highlighted (e.g., displayed brighter than before alignment of the center 510 of the jog dial control 502 with the answer line 512) before the incoming call is answered indicating to the user that they have answered the incoming phone call.

In some situations, a user may decide while moving the jog dial control 502 towards the answer icon 506 that they no longer want to answer the incoming call. The user can remove their finger from the jog dial activation point 504 before the center 510 of the jog dial control 502 aligns with the answer line 512. The removing of the user's finger from the jog dial activation point 504 disconnects or breaks the physical contact between the user and the touchscreen display device 104. The jog dial control 502 no longer rotates to the left towards the answer icon 506. The jog dial control 502 returns to its initial position as shown in FIG. 5. Alternatively, the user, using an arced rotation gesture, may move the jog dial control 502 to the right to return the jog dial control 502 to its initial position. The mobile computing device 100 continues to receive the incoming call.

In some situations, the user may decide to decline the incoming phone call (not answer the call on the mobile computing device 100). The user selects the jog dial control 502 by placing a finger in contact with a jog dial activation point 504. The user, using an arced rotation gesture, can move the jog dial control 502 to the right towards a decline icon 586. When a center 510 of the jog dial control 502 aligns with a decline line 514, the user declines the incoming phone call. The incoming phone call is then declined or not answered by the user (e.g., the mobile computing device 100 no longer indicates there is an incoming call and the caller is connected to the user's voicemail). In some implementations, when the center 510 of the jog dial control 502 aligns with the decline line 514, the decline icon 508 can be highlighted (e.g., displayed brighter than before alignment of the center 510 of the jog dial control 502 with the decline line 514) before the incoming call is declined indicating to the user that they have not answered the incoming phone call.

In some situations, a user may decide while moving the jog dial control 502 towards the decline icon 508 that they no longer want to decline the incoming call. The user can remove their finger from the jog dial activation point 504 before the center 510 of the jog dial control 502 aligns with the decline line 514. The removing of the user's finger from the jog dial activation point 504 disconnects or breaks the physical contact between the user and the touchscreen display device 104. The jog dial control 502 no longer rotates to the right towards the decline icon 508. The jog dial control 502 returns to its initial position as shown in FIG. 5. Alternatively, the user, using an arced rotation gesture, may move the jog dial control 502 to the left to return the jog dial control 502 to its initial position. The mobile computing device 100 continues to receive the incoming call.

Figure 6:
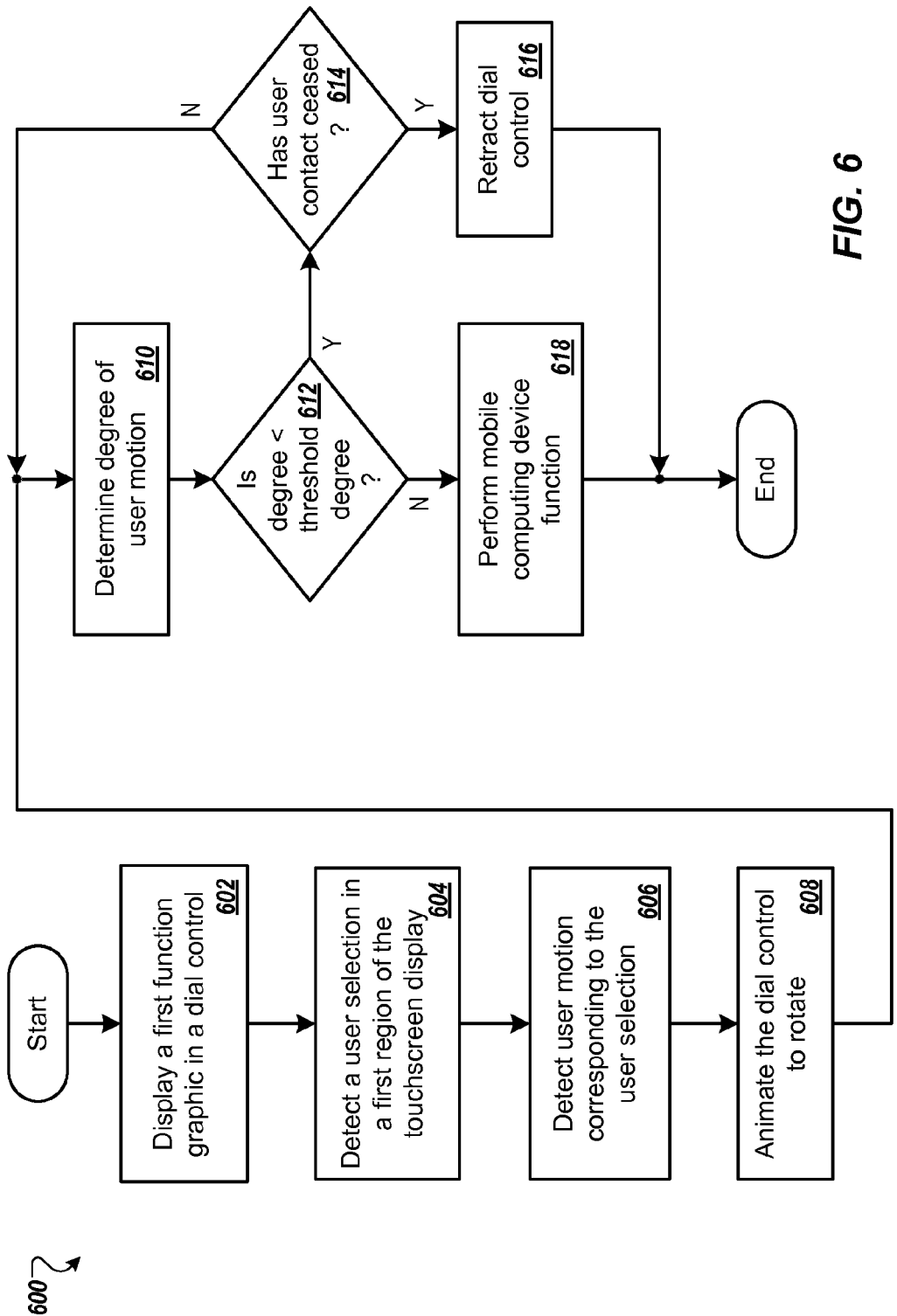
FIG. 6 is a flowchart of an exemplary process for using a dial control.

FIG. 6 is a flowchart of an exemplary process 600 for using a dial control. The process 500 can be used with the dial controls described in FIGS. 1A-1D, FIGS. 2A-2E, FIGS. 3A-3B, AND FIGS. 4A-4E. In addition, the process 600 can be used with the jog dial control described in FIG. 5.

The process begins by displaying a first function graphic in a dial control (step 602). For example, referring to FIG. 1A, the mobile computing device 100 displays the unlock graphic 108 on the touchscreen display device 104 in the unlock dial control 102, where the unlock dial control can be a first base position for the unlock graphic 108. The process 600 continues by detecting a user selection in a first region of the touchscreen display (step 604). For example, the user places their finger 101 on the unlock graphic 108 resulting in contact being made between the user and the touchscreen display device 104 and the selection of the unlock graphic 108 by the user. The first region of the touchscreen display can be associated with the unlock graphic 108. User motion corresponding to the user selection is detected (step 606). For example, the user uses an arcing gesture to move the unlock dial control 102 on the touchscreen display device 104 from the first side 110 of the touchscreen display device 104 towards the second side 128 of the touchscreen display device 104 within the arc 142. The dial control is animated to rotate (step 608). For example, as the user moves their finger 101 across the touchscreen display device 104 in an arcing gesture within the arc 142, the touchscreen display device 104 animates the display of the unlock dial control 102 within the arc 142.

A degree of user motion is determined (step 610). In step 612, if the degree of user motion is less than the threshold degree and, in step 614, it is determined that user contact with the graphic has not ceased, the process 600 continues to step 610 and the degree of user motion is again determined. In step 612, if the degree of user motion is less than the threshold degree and, in step 614, it is determined that user contact with the graphic has ceased, the dial control is retracted (step 616). In step 612, if the degree of user motion is equal to or greater than the threshold degree, the mobile device function is performed (step 618). For example, referring to FIGS. 1B and 1C, the mobile computing device 100 determines the user's finger 101 moved the unlock dial control 102 approximately three quarters of the way towards the second side 128, exceeding the threshold distance. The animation of the unlock dial control 102 continues on its path within the arc 142 towards the second side 128 even if the user removes their finger 101 from the unlock graphic 108. The mobile computing device 100 then unlocks. In another example, the user removes their finger from the unlock graphic 108 before they move the unlock dial control 102 to within the threshold measure in the arc 142. The removing of the user's finger from the unlock graphic 108 disconnects or breaks the physical contact between the user and the touchscreen display device 104. The unlock dial control 102 no longer moves across the touchscreen display device 104 in the arc 142. Referring to FIG. 1A, the unlock dial control 102 retracts back to its position along the first side 110.

The dial controls can be associated with various functions that the mobile computing device 100 can perform. For example, referring to FIG. 4A, dial control 430 may include a graphic representative for the silencing the mobile computing device 100 during the receipt of an incoming call. The user of the mobile computing device 100 can interact with the dial control 430 and the graphic in a similar manner as the camera activation dial control 144 shown in FIG. 1A in order to silence the ringer of the mobile computing device 100 while it is receiving an incoming call.

In some implementations, a user may hold the mobile computing device 100 in one hand such that the finger used to interact with the graphics and dial controls is their thumb. The user can make an arc rotation gesture with their thumb which is a natural gesture made by the thumb of a user while holding the mobile computing device 100, for example, in the palm of their hand.

The use of the dial controls described with reference to FIGS. 1A-1D, FIGS. 2A-2F, FIGS. 3A-3C and FIG. 4 is based on continual physical contact between the user and the touchscreen display device 104 to perform the task represented by the dial control (e.g., unlocking the mobile computing device 100, answering an incoming call, etc.). In addition, the mobile computing device 100 only performs the task until the user moves the dial control across the touchscreen display device 104 to within the threshold measure in an arc displayed on the touchscreen display device 104 of the mobile computing device 100. The continual physical contact between the user and the touchscreen display device 104 and the movement of the dial control having to exceed a threshold measure prior to performing a task reduces the likelihood of an inadvertent trigger of the task on the mobile computing device 100. For example, it would be difficult for the mobile computing device 100 to be unlocked from a locked state, while in the user's pocket.

In some implementations, when the user is holding the mobile computing device 100 in a portrait mode, the user maintaining their finger on a dial graphic accomplishes the continual physical contact between the user and the touchscreen display device 104. The user, while maintaining this contact, uses an arced rotation, side-to-side motion to move the dial control across the touchscreen display device 104. The touchscreen display device 104 can have a certain tolerance for up and down motion by the user while maintaining contact on the graphic of the dial control. However, if the user exceeds the tolerance, the touchscreen display device 104 will interpret the movement as disconnecting or breaking the contact between the user and the touchscreen display device 104 and the dial control will retract towards the side of the touchscreen display device 104 it originated from. The task associated with the dial control will not be performed (e.g., the mobile computing device 100 remains locked).

In some implementations, the user maintains their finger on a dial graphic accomplishing the continual physical contact needed between the user and the touchscreen display device 104. The user, while maintaining this contact, may use an arced rotation motion to move the dial control in an arc displayed on the touchscreen display device 104 forward across the touchscreen display device 104 to within a threshold measure. The task associated with the dial control can be performed once the dial control is moved to within or beyond the threshold measure. The user, while maintaining contact with the graphic in the dial control, may also move the dial control backwards towards the originating side of the touchscreen display device 104 for the dial control. This backwards movement can result in the dial control returning to its base position or originating side. The dial control can return to its base position because of the backwards movement of the dial control by the user and because of some retracting of the dial control once it reaches a certain point on the touchscreen display device 104. The task associated with the dial control will not be performed. For example, referring to FIGS. 2A and 2B, the user may move the sound off dial control 132 backwards towards the second side 128 resulting in the sound off dial control 132 retracting back to its original position as displayed on the touchscreen display device 104. The sound will then remain on for the mobile computing device 100. In some implementations, any backwards movement of a dial control will result in the dial control retracting to its original position as displayed on the touchscreen display device 104. The task associated with the dial control will not be performed.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be provided in digital electronic circuitry, or in computer software, firmware, or hardware, including the structures disclosed in this specification and their structural equivalents, or in combinations of one or more of them. Implementations may be provided as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be provided on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be provided in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A mobile device, comprising:
   a touchscreen display;
   one or more processors; and
   a computer-readable storage medium coupled to the one or more processors having instructions stored thereon which, when executed by the one or more processors, cause the one or more processors to perform operations comprising:
   displaying a first function graphic in a first dial control and a second function graphic in a second dial control, the first dial control and the second dial control displayed within an arc, the first dial control displayed at a first base position on the touchscreen display and the second dial control displayed at a second, differing base position on the touchscreen display;
   detecting a user selection in a first region of the touchscreen display, the first region associated with the first function graphic;
   in response to detecting the user selection in the first region associated with the first function graphic, removing the second function graphic from the second dial control;
   detecting user motion corresponding to the user selection;
   in response to detecting the user motion, animating an arcing movement of the first dial control, including the first function graphic, from the first base position on the touchscreen display across the arc, and animating an arcing movement of the second dial control, absent the second function graphic, from the second, differing base position on the touchscreen display across the arc;
   determining a measure of the user motion;
   comparing the measure of the user motion to a threshold measure; and
   performing one or more functions on the mobile device associated with the first function graphic in response to the measure of the user motion exceeding the threshold measure.

2. The mobile device of claim 1, wherein the one or more functions comprise entering or exiting an unlocked mode, answering or declining a received call, changing a mode of a ringer, and executing an application on the mobile device.

3. The mobile device of claim 1, wherein the operations further comprise continuing animation of the first dial control to rotate on the touchscreen display in response to the measure of the user motion exceeding the threshold measure.

4. The mobile device of claim 1, wherein the operations further comprise:
   detecting cessation of the user selection;
   determining, upon detecting cessation of the user selection, that the degree of the user motion is less than the threshold degree; and
   animating the first dial control to rotate for arcing movement of the first dial control back to the first base position on the touchscreen display.

5. The mobile device of claim 1, wherein the one or more functions further comprise:
   removing the arc from the touchscreen display; and
   displaying a plurality of icons on the touchscreen display, each icon corresponding to a respective application executable by the mobile device.

6. The mobile device of claim 1, wherein the operations further comprise displaying a first instructional graphic in response to detecting the user selection in the first region.

7. The mobile device of claim 6, wherein the first instructional graphic comprises characters and an arcing arrow.

8. A non-transitory computer-storage medium encoded with a computer program, the program comprising instructions that when executed by one or more computers cause the one or more computers to perform operations comprising:
   displaying a first function graphic in a first dial control and a second function graphic in a second dial control, the first dial control and the second dial control displayed within an arc, the first dial control displayed at a first base position on a touchscreen display of a mobile device and the second dial control displayed at a second, differing base position on the touchscreen display of the mobile device;
   detecting a user selection in a first region of the touchscreen display, the first region associated with the first function graphic;
   in response to detecting the user selection in the first region associated with the first function graphic, removing the second function graphic from the second dial control;
   detecting user motion corresponding to the user selection;
   in response to detecting the user motion, animating an arcing movement of the first dial control, including the first function graphic, from the first base position on the touchscreen display across the arc, and animating an arcing movement of the second dial control, absent the second function graphic, from the second, differing base position on the touchscreen display across the arc;
   determining a measure of the user motion;
   comparing the measure of the user motion to a threshold measure; and
   performing one or more functions on the mobile device associated with the first function graphic in response to the measure of the user motion exceeding the threshold measure.

9. The non-transitory computer-storage medium of claim 8, wherein the one or more functions comprise entering or exiting an unlocked mode, answering or declining a received call, changing a mode of a ringer, and executing an application on the mobile device.

10. The non-transitory computer-storage medium of claim 8, wherein the operations further comprise continuing animation of the first dial control to rotate on the touchscreen display in response to the measure of the user motion exceeding the threshold measure.

11. The non-transitory computer-storage medium of claim 8, wherein the operations further comprise:
    detecting cessation of the user selection;
    determining, upon detecting cessation of the user selection, that the degree of the user motion is less than the threshold degree; and
    animating the first dial control to rotate for arcing movement of the first dial control back to the first base position on the touchscreen display.

12. The non-transitory computer-storage medium of claim 8, wherein the operations further comprise:
    removing the arc from the touchscreen display; and
    displaying a plurality of icons on the touchscreen display, each icon corresponding to a respective application executable by the mobile device.

13. A computer-implemented method comprising:
    displaying a first function graphic in a first dial control and a second function graphic in a second dial control, the first dial control and the second dial control displayed within an arc, the first dial control displayed at a first base position on a touchscreen display of a mobile device and the second dial control displayed at a second, differing base position on the touchscreen display of the mobile device;

detecting a user selection in a first region of the touchscreen display, the first region associated with the first function graphic;

in response to detecting the user selection in the first region associated with the first function graphic, removing the second function graphic from the second dial control;

detecting user motion corresponding to the user selection;

in response to detecting the user motion, animating an arcing movement of the first dial control, including the first function graphic, from the first base position on the touchscreen display across the arc, and animating an arcing movement of the second dial control, absent the second function graphic, from the second, differing base position on the touchscreen display across the arc;

determining a measure of the user motion;

comparing the measure of the user motion to a threshold measure; and performing one or more functions on the mobile device associated with the first function graphic in response to the measure of the user motion exceeding the threshold measure.

14. The computer-implemented method of claim 13, further comprising entering or exiting an unlocked mode, answering or declining a received call, changing a mode of a ringer, and executing an application on the mobile device.

15. The computer-implemented method of claim 13, further comprising continuing animation of the first dial control to rotate on the touchscreen display in response to the measure of the user motion exceeding the threshold measure.

16. The computer-implemented method of claim 13, further comprising:

detecting cessation of the user selection;

determining, upon detecting cessation of the user selection, that the degree of the user motion is less than the threshold degree; and animating the first dial control to rotate for arcing movement of the first dial control back to the first base position on the touchscreen display.

17. The computer-implemented method of claim 13, further comprising:

removing the arc from the touchscreen display; and displaying a plurality of icons on the touchscreen display, each icon corresponding to a respective application executable by the mobile device.

18. The computer-implemented method of claim 13, further comprising displaying a first instructional graphic in response to detecting the user selection in the first region.

19. The computer-implemented method of claim 18, wherein the first instructional graphic comprises characters and an arcing arrow.

\* \* \* \* \*